United States Patent
Zhang et al.

(10) Patent No.: US 10,018,780 B2
(45) Date of Patent: Jul. 10, 2018

(54) DOPING OPTIMIZED SINGLE-MODE OPTICAL FIBER WITH ULTRA LOW ATTENUATION

(71) Applicant: YANGTZE OPTICAL FIBRE AND CABLE JOINT STOCK LIMITED COMPANY, Wuhan, Hubei (CN)

(72) Inventors: Lei Zhang, Hubei (CN); Shengya Long, Hubei (CN); Jihong Zhu, Hubei (CN); Jun Wu, Hubei (CN); Ruichun Wang, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 15/725,014

(22) Filed: Oct. 4, 2017

(65) Prior Publication Data
US 2018/0052280 A1 Feb. 22, 2018

Related U.S. Application Data

(63) Continuation of application No. PCT/CN2015/096108, filed on Dec. 1, 2015.

(30) Foreign Application Priority Data

Jun. 25, 2015 (CN) .......................... 2015 1 0359450

(51) Int. Cl.
*G02B 6/02* (2006.01)
*G02B 6/00* (2006.01)
(Continued)

(52) U.S. Cl.
CPC ........ *G02B 6/03683* (2013.01); *C03C 13/046* (2013.01); *C03C 2213/00* (2013.01)

(58) Field of Classification Search
CPC ............ G02B 6/02014; G02B 6/02019; G02B 6/02266; G02B 6/03683; C03C 13/046; C03C 2213/00
(Continued)

(56) References Cited

U.S. PATENT DOCUMENTS 8,849,084 B2 * 9/2014 Yang .................. G02B 6/03605
385/127
2004/0228593 A1 * 11/2004 Sun ..................... G02B 6/02014
385/127
(Continued)

FOREIGN PATENT DOCUMENTS

CN 102156323 A 8/2011
CN 102645699 A 8/2012
(Continued)

OTHER PUBLICATIONS

International Search Report (ISR) issued by the State Intellectual Property Office of the Peoples Republic of China dated Apr. 1, 2016 for PCT/CN2015/096108, China.

*Primary Examiner* — Jerry Rahll
*Assistant Examiner* — Michael Mooney
(74) *Attorney, Agent, or Firm* — Tim Tingkang Xia, Esq.; Locke Lord LLP

(57) ABSTRACT

A doping optimized single-mode optical fiber with ultra low attenuation includes a core layer and cladding layers. The cladding layers has an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer. The content of fluorine in the core layer is ≤0.5 wt %, $\Delta Ge \le 0.12\%$, $\Delta n_1 \le 0.12\%$. The content of fluorine in the inner cladding layer is 0.5-1.5 wt %, $\Delta n_2 \le -0.14\%$. The content of fluorine in the trench cladding layer is 1-3 wt %, $\Delta n_3 \le -0.25\%$. The (Continued)

content of fluorine in the auxiliary outer cladding layer is 0.5-2 wt %, $\Delta n_4 \leq -0.14\%$. The outer cladding layer is a pure silicon dioxide glass layer and/or a metal-doped silicon dioxide glass layer.

14 Claims, 2 Drawing Sheets

(51) Int. Cl.
   *G02B 6/036* (2006.01)
   *C03C 13/04* (2006.01)
(58) Field of Classification Search
   USPC .... 385/123–128, 141–144; 65/415–419, 428
   See application file for complete search history.

(56) References Cited

U.S. PATENT DOCUMENTS

| | | |
|---|---|---|
| 2010/0022533 A1 | 1/2010 | Chen et al. |
| 2010/0195999 A1 | 8/2010 | Kikuchi |
| 2014/0169748 A1 | 6/2014 | Lingle et al. |
| 2014/0241686 A1 | 8/2014 | Kitamura et al. |

FOREIGN PATENT DOCUMENTS

| | | |
|---|---|---|
| CN | 102933996 A | 2/2013 |
| CN | 103454719 A | 12/2013 |
| CN | 103864291 A | 6/2014 |
| CN | 104360434 A | 2/2015 |
| CN | 104898200 A | 9/2015 |

* cited by examiner

DOPING OPTIMIZED SINGLE-MODE OPTICAL FIBER WITH ULTRA LOW ATTENUATION

CROSS-REFERENCE TO RELATED APPLICATIONS

This application is a continuation application of International Patent Application No. PCT/CN2015/096108, filed Dec. 1, 2015, which itself claims priority to Chinese Patent Application No. 201510359450.4, filed Jun. 25, 2015 in the State Intellectual Property Office of P.R. China, which are hereby incorporated herein in their entireties by reference.

FIELD OF THE INVENTION

The present invention relates generally to the field of optical communications, and more particularly, to a doping optimized single-mode optical fiber with ultra low attenuation.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Currently, in the optical fiber manufacturing, there are mainly two types of novel single-mode optical fiber products which are quite popular. One is a G652 optical fiber with ultra low attenuation. Because of a low attenuation coefficient and good compatibility performance, the G652 optical fiber with ultra low attenuation becomes one of representatives of future novel optical fibers. The other one is a G654 optical fiber with a large effective area. By increasing an effective area of the optical fiber and restraining the non-linear effect during optical fiber transmission, the G654 optical fiber with the large effective area is more suitable for a long-distance large-capacity transmission system.

For optical fiber manufacturing industries, it is a great challenge to find an effective method to reduce an optical fiber attenuation coefficient of both the G652 optical fiber with ultra low attenuation and the G654 optical fiber with a large effective area, and control manufacturing costs. The main difficulties lie in the following three aspects:

1. How to decrease attenuation: Currently, a main method is to decrease a Rayleigh scattering coefficient of an optical fiber by controlling the composition of a glass material and controlling a thermodynamics changing process of the glass in a manufacturing process.

2. The optical fiber manufacturing process needs to be simple and controllable, and optical fiber manufacturing costs should not be significantly increased. Currently, controlling of the current ultra low attenuation process is complex. Especially for a design of a currently common pure silicon core layer with ultra low attenuation, to ensure total reflection of the optical fiber, a cladding uses an outer cladding layer material doped with only fluorine. The manufacturing process is complex, and costs of the optical fiber are greatly affected.

3. Besides an ultra low attenuation coefficient, it needs to ensure that optical parameters of the optical fiber satisfy the ITU-T standard, which mainly means that a mode field diameter (MFD), a chromatic dispersion, a cut-off wavelength, and a flexibility property need to be controlled within ranges required by the standard. That is, not only ultra low attenuation performance of the optical fiber needs to be ensured, but also other optical parameters need to be controlled within corresponding ranges.

For the foregoing three difficulties, how to decrease attenuation of the optical fiber is specifically discussed first. Attenuation of a silica optical fiber at a wavelength range from 600 nm to 1600 nm is mainly caused by Rayleigh scattering, and attenuation $\alpha_R$ caused by Rayleigh scattering may be calculated according to the following equation:

$$\alpha_R = \frac{1}{\lambda^4}\int_0^{+\infty} R(r)P(r)rdr \bigg/ \int_0^{+\infty} P(r)rdr = \frac{R}{\lambda^4} + B$$

where $\lambda$ is a wavelength (μm); R is a Rayleigh scattering coefficient (dB/km/μm$^4$); P is a light intensity; and when the Rayleigh scattering coefficient is determined, B is a corresponding constant. Therefore, the attenuation $\alpha_R$ (dB/km) caused by Rayleigh scattering may be obtained as long as the Rayleigh scattering coefficient R is determined. Rayleigh scattering is caused by density fluctuation in one aspect, and caused by concentration fluctuation in another aspect. Accordingly, the Rayleigh scattering coefficient R may be represented as:

$$R=R_d+R_c$$

where $R_d$ and $R_c$ respectively represent changes in the Rayleigh scattering coefficient caused by the density fluctuation and the concentration fluctuation. $R_c$ is a concentration fluctuation factor, and is mainly affected by a doping concentration of glass of the optical fiber. Theoretically, $R_c$ is smaller when less Ge and F or other dopants are used. Because of this, currently, some foreign enterprises use a design of a pure silicon core layer to achieve ultra low attenuation performance.

It should be noted that the Rayleigh scattering coefficient further includes another parameter $R_d$. $R_d$ is related to a fictive temperature $T_F$ of the glass, and changes as the structure and the temperature of the glass change. The fictive temperature $T_F$ of the glass is a physical parameter that represents the structure of the glass, and is defined as a temperature corresponding to a balanced state in which the structure of the glass is no longer adjusted when the glass is rapidly cooled from a temperature T' to a room temperature. When T'>$T_f$ (a softening temperature of the glass), because the glass has a relatively small viscosity, and the structure of the glass is easy to be adjusted, at each moment, the glass is in the balanced state, and therefore, $T_F$=T'. When T'<$T_g$ (a transition temperature of the glass), because the glass has a relatively large viscosity, and the structure of the glass is difficult to be adjusted, structure adjustment of the glass lags behind the temperature change, and therefore, $T_F$>T'. When $T_g$<T'<$T_f$ (the softening temperature of the glass), the glass needs a relatively short time to tend to a balance. A specific time is related to the composition and a cooling speed of the glass, and therefore, $T_F$>T' or $T_F$<T'.

When a design of a pure silicon core layer is used, to ensure total reflection of an optical fiber, the pure silicon core layer needs to match an inner cladding layer doped with fluorine (F) that has a relatively low refractive index, to ensure a sufficient refractive index difference maintained between the core layer and the inner cladding layer. Therefore, the core layer of the pure silicon core layer has a relatively high viscosity, and the inner cladding layer doped with a large amount of F has a relatively low viscosity. As a result, viscosity matching of the optical fiber structure is unbalanced, and the virtual temperature of the optical fiber having the pure silicon core layer structure increases rapidly, causing an increase in $R_d$ of the optical fiber. Consequently, benefits brought by a decrease in $R_c$ are counteracted, and abnormality in attenuation of the optical fiber may further be caused instead.

In view of the foregoing, theoretically, an ultra low attenuation coefficient cannot be obtained simply by reducing dopants in a core layer. To resolve this problem, U.S. Publication No. US2010/0195999A1 discloses a method in which an alkali metal is added to a core layer is used. The core layer of an optical fiber still uses a pure silicon core layer, and an increase in $R_d$ caused by viscosity mismatching is resolved by changing a viscosity of the core layer of the optical fiber and a structural relaxation time of the core layer, so as to overall decrease a Rayleigh scattering coefficient of the optical fiber. However, although optical fiber attenuation according to this method can be effectively decreased, a manufacturing process is relatively complex, a core layer rod needs to be processed in multiple batches, and there is an extremely high requirement on controlling of the doping concentration of the alkali metal, hindering manufacturing of the optical fiber in a large scale.

Chinese Application No. CN201310394404 provides a design of an optical fiber with ultra low attenuation. The optical fiber uses a design of a pure silicon dioxide outer cladding layer. However, because the optical fiber uses a typical step profile structure, and does not use a design of a trench cladding layer to optimize bending of the optical fiber, and a core layer of the optical fiber is not doped with Ge, viscosity mismatching may occur during manufacturing of a preformed rod, and it may be found that the optical fiber has undesirable attenuation and a relatively poor bending level.

U.S. Publication No. US2010022533 discloses a design of an optical fiber as so to obtain a lower Rayleigh coefficient. The optical fiber uses a design of a pure silicon core layer, germanium and fluorine are not doped in the core layer, and silicon dioxide doped with fluorine is used as an outer cladding layer in the design of the optical fiber. Such a design of the pure silicon core layer requires complex viscosity matching inside the optical fiber, and an extremely low speed needs to be used in a drawing process, to avoid an increase in attenuation resulted from defects inside the optical fiber caused by high-speed drawing. The manufacturing process is extremely complex.

It can be found from the foregoing description that, to obtain a reduced attenuation coefficient, if the design of a pure silicon core layer, or the design of a core layer not doped with germanium (Ge) is used, the composition of a core layer material needs to be strictly controlled, so that the viscosity of the core layer material matches that of an outer cladding layer material, and an increase in $R_d$ of the optical fiber is reduced.

However, as is well known, from the point of view of process implementations, it is quite complex to control the composition of a core layer material, especially when an alkali metal or another element that reduces a virtual temperature of an optical fiber is added to a core layer. Consequently, manufacturing costs of the optical fiber are increased. In addition to doping an alkali metal in the core layer of the pure silicon core layer, can the same effect be achieved by designing the viscosities of the outer cladding layer and the inner cladding layer? As is known, the virtual temperature of the core layer of the optical fiber is affected by the composition of the outer cladding layer material. Therefore, by designing the viscosities of the outer cladding layer and the inner cladding layer, and especially by doping metal ions to an outermost layer, that is, the outer cladding layer, of the glass of the optical fiber, a material relaxation time of each part of the optical fiber material can be significantly changed, thereby changing the virtual temperature of the optical fiber. Therefore, the concept of a non-pure silicon core layer can be used in the process, and by suitably designing the viscosities of the parts of the optical fiber, a simple manufacturing method for the core layer may be found, thereby achieving an optical fiber with ultra low attenuation.

The second difficulty in achieving the optical fiber with ultra low attenuation is cost control. For a common design of a single-mode optical fiber with ultra low attenuation, a design of an outer cladding layer doped with only fluorine is used. From the point of view of optical fiber optics, such a design is relatively simple, and a requirement on total reflection of the optical fiber can be satisfied, as long as a refractive index difference between the outer cladding layer and the core layer is ensured. However, currently, there are three main factors that restrain manufacturing costs of the optical fiber with ultra low attenuation. First, currently, manufacturing costs of mainstream alkali metal processes are high, and efficiency is low. Second, a preformed rod using the design of doping only fluorine has a relatively small size, and a drawing process is complex. Third, because an F doping process is used, manufacturing costs of the optical fiber using the design of doping only fluorine are quite high. According to preliminary estimation by using current market prices, the price of an F-doped tube is five to eight times the price of a pure silicon dioxide tube. According to calculation by using the initial relationship that costs of an F-doped material is six times costs of a pure silicon dioxide material, if the thickness of an F-doped layer is appropriately reduced by using an appropriate process design, manufacturing costs of the optical fiber can be significantly reduced. Assuming that an F-doped material is used only at positions of the diameter of the optical fiber from 30 microns to 80 microns, and a common pure silicon dioxide is used at positions from 80 microns to 125 microns, material costs of this design is reduced by 40% compared with a conventional design of an optical fiber with ultra low attenuation that only uses the F-doped material. If the F-doped material is used at positions from 30 microns to 60 microns, and the common pure silicon dioxide is used at positions from 60 microns to 125 microns, material costs of this design is reduced by 65%.

It can be found from the foregoing analysis that, a process design of an optical fiber with ultra low attenuation that uses both a non-pure silicon core layer and a cladding doped with fluorine is feasible. Affected by the foregoing two restrictive factors, the final challenge confronted is to control optical parameters of the optical fiber in such a design.

Because if pure silicon dioxide not doped with fluorine is used as the outer cladding layer material, there are three problems.

First, a cutoff of a fundamental mode is restrained: A relatively small refractive index difference between the outer cladding layer material and the core layer material causes fundamental mode leakage of the optical fiber, and further affects attenuation of the optical fiber. If an optical fiber with ultra low attenuation that is designed with the outer cladding layer material not doped with F is used, an optical fiber section needs be appropriately designed at the middle position between the outer cladding layer and the core layer, to restrain the fundamental mode leakage.

Second, viscosity matching is considered: If no viscosity optimization design is made for the outer cladding layer material, and the viscosity of the outer cladding layer material does not match a viscosity gradient between the inner cladding layer and the core layer, problems such as defects of boundary surface positions and an increase in the virtual temperature are caused, and consequently, optical fiber attenuation increases.

Third, matching of optical sections is considered: If pure silicon dioxide glass is used as the outer cladding layer material, when a viscosity matching design is considered, the doping concentration of each part is confined. To ensure that the optical parameter of the optical fiber satisfies the parameter requirements of the G652 or G654 optical fiber, that is, to ensure that the MFD, the chromatic dispersion, and the bending performance of the optical fiber can satisfy the standard requirements, an optical section design needs to be considered. Therefore, it is required that when the viscosity is designed, an optical design of the optical fiber should be taken into overall consideration. This increases a difficulty in process implementation.

Therefore, a heretofore unaddressed need exists in the art to address the aforementioned deficiencies and inadequacies.

SUMMARY OF THE INVENTION

One of the objectives of the present invention is to provide a doping optimized single-mode optical fiber with ultra low attenuation to overcome disadvantages existing in the prior art. By means of an optimized design of the viscosities and waveguide structures of various parts of the optical fiber, ultra low attenuation performance is achieved, a process is simplified, and manufacturing costs are reduced.

In one aspect of the invention, the doping optimized single-mode optical fiber with ultra low attenuation includes a core layer and cladding layers surrounding the core layer.

In certain embodiments, the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer.

In certain embodiments, a content of fluorine in the core layer is less than or equal to about 0.5 wt %, a relative refractive index contribution ΔGe of germanium in the core layer is less than or equal to about 0.12%, and a relative refractive index $\Delta n_1$ of the core layer is less than or equal to about 0.12%;

In certain embodiments, a content of fluorine in the inner cladding layer is in a range of about 0.5 wt % to 1.5 wt %, and a relative refractive index $\Delta n_2$ of the inner cladding layer is less than or equal to about −0.14%. A content of fluorine in the trench cladding layer is in a range of about 1 wt % to 3 wt %, and a relative refractive index $\Delta n_3$ of the trench cladding layer is less than or equal to about −0.25%. A content of fluorine in the auxiliary outer cladding layer is in a range of about 0.5 wt % to 2 wt %, and a relative refractive index $\Delta n_4$ of the auxiliary outer cladding layer is less than or equal to about −0.14%. The outer cladding layer is a pure silicon dioxide glass layer and/or a metal-doped silicon dioxide glass layer.

In certain embodiments, metal dopants doped in the outer cladding layer comprise aluminum and alkali metals, and a total content of the metal dopants is less than or equal to about 25 ppm, where a content of aluminum is in a range of about 1 ppm to 18 ppm, and a total content of the alkali metals is less than or equal to about 2 ppm.

In certain embodiments, the alkali metals are one or more of lithium, sodium and potassium.

In certain embodiments, the metal dopants further comprise one or more of iron, calcium, magnesium and titanium.

In certain embodiments, a radius $r_1$ of the core layer is in a range of about 4.0 μm to 6.0 μm.

In certain embodiments, a radius $r_2$ of the inner cladding layer is in a range of about 10 μm to 14 μm, a radius $r_3$ of the trench cladding layer is in a range of about 12.5 μm to 17 μm, and a radius $r_4$ of the auxiliary outer cladding layer is in a range of about 40 μm to 50 μm.

In certain embodiments, a diameter of the outer cladding layer is about 125 μm.

In certain embodiments, the relative refractive index $\Delta n_1$ of the core layer is in a range of about 0.12% to −0.08%, the relative refractive index $\Delta n_2$ of the inner cladding layer is in a range of about −0.14% to −0.35%, the relative refractive index $\Delta n_3$ of the trench cladding layer is in a range of about −0.25% to −0.75%, and the relative refractive index $\Delta n_4$ of the auxiliary outer cladding layer is in a range of about −0.14% to −0.56%.

In certain embodiments, an attenuation coefficient of the optical fiber at a wavelength of about 1550 nm is less than or equal to about 0.175 dB/km.

Among other things, the present invention has the following beneficial effects.

1. An optimized design of unique viscosity matching and waveguide structures: the core layer is doped with Ge and F, thereby decreasing the viscosity of the core layer, so that the core layer can better match the inner cladding layer and the trench cladding layer. In addition, the core layer is combined with the metal-doped outer cladding layer having a matching viscosity. In this way, the virtual temperature of the optical fiber is overall decreased, thereby achieving ultra low attenuation performance.

2. By means of the trench cladding layer design, fundamental mode leakage is restrained.

3. A pure silicon dioxide outer cladding layer material is used in the outer cladding layer part, overall reducing costs of the optical fiber.

4. A core layer alkali metal material process is not used, and a process control difficulty is decreased.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention.

Wherever possible, the same reference numbers are used throughout the drawings to refer to the same or like elements of an embodiment.

DETAILED DESCRIPTION OF THE INVENTION

Figure 1:
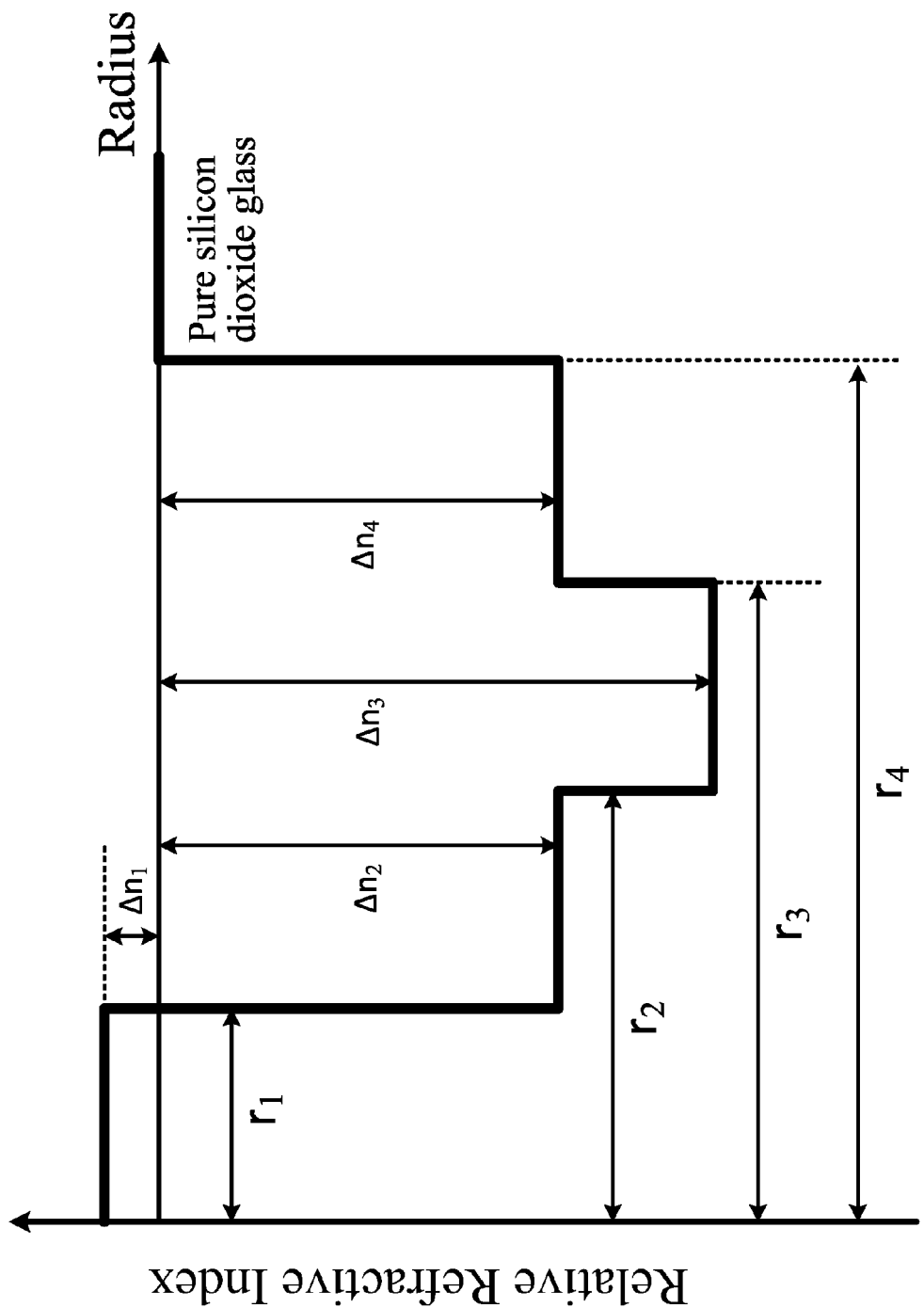
FIG. 1 is a diagram of a refractive-index profile structure distribution of an optical fiber according to an embodiment of the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "ppm" refers to one-millionth by weight.

From a central axis of an optical fiber, according to changing of a refractive index, a layer closest to the axis is defined as a core layer, i.e., the core layer refers to a central area of a cross section of the fiber, and an outmost layer of the fiber, i.e., a pure-silicon-dioxide layer and/or a metal-doped silicon dioxide glass layer, is defined as an outer cladding layer of the fiber.

As used herein, a relative refractive index $\Delta n_i$ of a layer of a fiber is defined according to the following formula:

$$\Delta n_i = \frac{n_i - n_c}{n_c} \times 100\%$$

where $n_i$ is a refractive index of the corresponding layer, and $n_c$ is a refractive index of the outer cladding layer, that is, a refractive index of the pure silicon dioxide without dopants of Ge or F.

A contribution of doped Ge in the core layer of the optical fiber to the refractive index $\Delta Ge$ is defined according to the following equation:

$$\Delta Ge = \frac{n_{Ge} - n_c}{n_c} \times 100\%,$$

where $n_{Ge}$ is a change of the refractive index of the silicon dioxide glass caused by the doped substance Ge doped in the core layer, provided that the doped substance Ge doped in the core layer is doped in the pure silicon dioxide that includes no other doped substance.

The description will be made as to the embodiments of the present invention in conjunction with the accompanying drawings. In accordance with the purposes of this invention, as embodied and broadly described herein, this invention, in one aspect, relates to a doping optimized single-mode optical fiber with ultra low attenuation.

Figure 2:
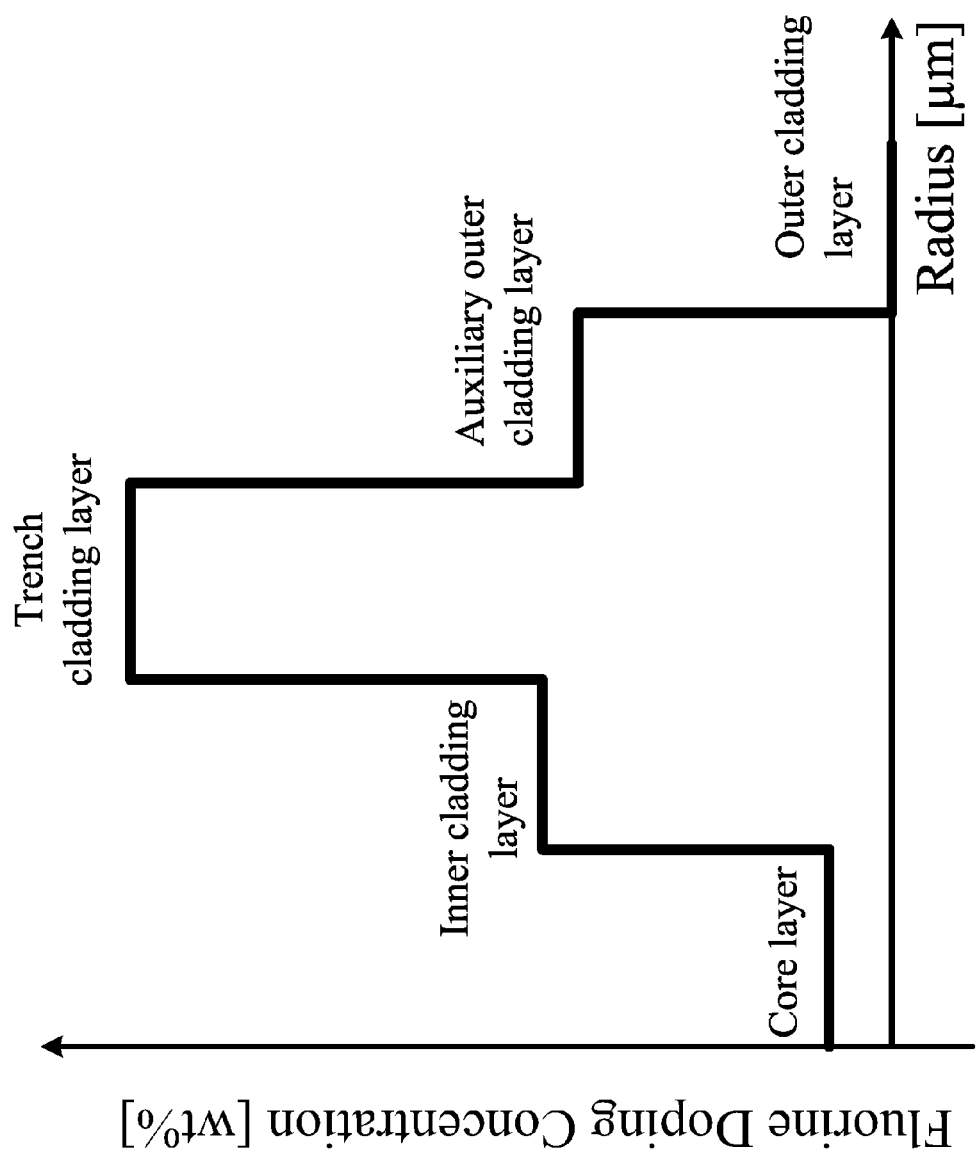
FIG. 2 is a diagram of a fluorine doping concentration distribution in different layers of the optical fiber according to an embodiment of the present invention.

According to one embodiment of the invention as shown in FIGS. 1 and 2, the optical fiber includes a core layer and cladding layers surrounding the core layer.

The cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer.

In certain embodiments, a content of fluorine in the core layer is less than or equal to about 0.5 wt %, a relative refractive index contribution ΔGe of germanium in the core layer is less than or equal to about 0.12%, and a relative refractive index $\Delta n_1$ of the core layer is less than or equal to about 0.12%;

In certain embodiments, a content of fluorine in the inner cladding layer is in a range of about 0.5 wt % to 1.5 wt %, and a relative refractive index $\Delta n_2$ of the inner cladding layer is less than or equal to about −0.14%. A content of fluorine in the trench cladding layer is in a range of about 1 wt % to 3 wt %, and a relative refractive index $\Delta n_3$ of the trench cladding layer is less than or equal to about −0.25%. A content of fluorine in the auxiliary outer cladding layer is in a range of about 0.5 wt % to 2 wt %, and a relative refractive index $\Delta n_4$ of the auxiliary outer cladding layer is less than or equal to about −0.14%.

In certain embodiments, metal dopants doped in the outer cladding layer comprise aluminum and alkali metals, and a total content of the metal dopants is less than or equal to about 25 ppm, wherein a content of aluminum is in a range of about 1 ppm to 18 ppm, and a total content of the alkali metals is less than or equal to about 2 ppm.

In certain embodiments, the alkali metals are one or more of lithium (Li), sodium (Na) and potassium (K).

In certain embodiments, the metal dopants further comprise one or more of iron (Fe), calcium (Ca), magnesium (Mg) and titanium (Ti).

In certain embodiments, a radius $r_1$ of the core layer is in a range of about 4.0 μm to 6.0 μm.

In certain embodiments, a radius $r_2$ of the inner cladding layer is in a range of about 10 μm to 14 μm, a radius $r_3$ of the trench cladding layer is in a range of about 12.5 μm to 17 μm, and a radius $r_4$ of the auxiliary outer cladding layer is in a range of about 40 μm to 50 μm.

In certain embodiments, the relative refractive index $\Delta n_1$ of the core layer is in a range of about 0.12% to −0.08%, the relative refractive index $\Delta n_2$ of the inner cladding layer is in a range of about −0.14% to −0.35%, the relative refractive index $\Delta n_3$ of the trench cladding layer is in a range of about −0.25% to −0.75%, and the relative refractive index $\Delta n_4$ of the auxiliary outer cladding layer is in a range of about −0.14% to −0.56%.

In certain embodiments, an attenuation coefficient of the optical fiber at a wavelength of about 1550 nm is less than or equal to about 0.175 dB/km.

In certain embodiments, the outer cladding layer is a pure silicon dioxide glass layer and/or a metal-doped silicon dioxide glass layer. A diameter of the outer cladding layer is about 125 μm.

In certain embodiments, the optical fiber is manufactured by drawing a preformed rod. The preformed rod mainly includes two parts: an optical fiber core layer rod prepared by using a plasma chemical vapor deposition (PCVD) process/method, and a large hollow tube of a natural quartz sand material. The optical fiber core layer rod and the large tube are assembled by inserting the core layer rod into the tube.

The core layer rod of the optical fiber preformed rod includes a fiber core layer, an inner cladding layer, a trench cladding layer, and an auxiliary inner cladding layer. The optical fiber core layer manufactured by means of the PCVD process includes quartz glass doped with fluorine and germanium. The inner cladding layer tightly surrounds the core layer, and is manufactured by using the PCVD process that is the same as the core layer. The trench cladding layer includes silicon dioxide quartz glass doped with fluorine deposited by using the PCVD process. The third cladding is the auxiliary outer cladding layer, and includes silicon dioxide quartz glass doped with fluorine deposited by using the PCVD process, and a liner tube obtained by means of the PCVD process.

The large tube made of natural quartz sand is manufactured by using natural quartz sand of four different grades as raw materials. Numbers and specific dopant content are shown in Table 1. Table 2 shows designs of an optical fiber sleeved with different materials thereon and corresponding attenuation coefficients thereof.

TABLE 1

The content of raw material dopants of the large hollow tube

| Nos. of outer cladding layer materials | Al | Fe | Ca | Mg | Ti | Mn | Cu | Li | Na | K | B | Ge | Total (ppm) |
|---|---|---|---|---|---|---|---|---|---|---|---|---|---|
| A | 7.3 | 0.1 | 0.7 | 0 | 1.3 | 0 | 0 | 0.2 | 0.1 | 0.1 | <0.1 | 0.9 | 10.5 |
| B | 10.8 | 0.2 | 0.6 | 0 | 1.3 | 0 | 0 | 0.4 | 0.1 | 0.1 | <0.1 | 1.3 | 14.8 |
| C | 14.8 | 0 | 0.4 | 0 | 1.1 | 0 | 0 | 0.5 | 0.2 | 0.2 | <0.1 | 1.1 | 18.3 |
| D | 17.8 | 0.2 | 0.7 | 0 | 1.1 | 0 | 0 | 0.7 | 0.4 | 0.3 | <0.1 | 1.3 | 22.3 |
| Note: Measurement threshold | 0.5 | 0.1 | 0.1 | 0.05 | 0.05 | 0.05 | 0.05 | 0.05 | 0.1 | 0.1 | 0.1 | 0.1 | |

TABLE 2

Parameters of optical fibers and corresponding attenuation coefficients according to embodiments of the present invention

| Nos. | r1 [μm] | ΔGe in the core layer [%] | r2 [μm] | Content of F doped in the inner cladding layer [wt %] | r3 [μm] | Content of F doped in the trench cladding layer [wt %] | r4 [μm] | Content of F doped in the auxilialy inner cladding layer [wt %] | Type of the outer cladding layer materials | Att.@1550 nm [dB/km] |
|---|---|---|---|---|---|---|---|---|---|---|
| 1 | 5.5 | 0.02 | 11 | 0.9 | 13.5 | 1.9 | 42 | 1.2 | A | 0.162 |
| 2 | 5.4 | 0.05 | 11.5 | 1 | 15.5 | 1.5 | 48 | 1.3 | B | 0.168 |
| 3 | 6 | 0.05 | 12.5 | 1.1 | 15.5 | 1.7 | 45 | 1.5 | D | 0.174 |

TABLE 2-continued

Parameters of optical fibers and corresponding attenuation coefficients according to embodiments of the present invention

| Nos. | r1 [μm] | ΔGe in the core layer [%] | r2 [μm] | Content of F doped in the inner cladding layer [wt %] | r3 [μm] | Content of F doped in the trench cladding layer [wt %] | r4 [μm] | Content of F doped in the auxilialy inner cladding layer [wt %] | Type of the outer cladding layer materials | Att.@1550 nm [dB/km] |
|---|---|---|---|---|---|---|---|---|---|---|
| 4 | 4.7 | 0.06 | 12 | 1.2 | 14.5 | 2.2 | 38 | 1 | A | 0.166 |
| 5 | 5.2 | 0.14 | 10.5 | 0.74 | 14 | 1.35 | 41 | 0.9 | C | 0.173 |
| 6 | 6 | 0.09 | 13 | 0.85 | 16 | 2.1 | 40 | 1.5 | B | 0.172 |
| 7 | 5.3 | 0.07 | 10 | 1.3 | 12.8 | 1.8 | 46 | 1.6 | B | 0.165 |
| 8 | 4.5 | 0.04 | 11 | 1.5 | 16.5 | 2.7 | 47 | 2.0 | A | 0.164 |
| 9 | 4 | 0.12 | 10 | 1.4 | 13.7 | 2.3 | 44 | 1.8 | B | 0.169 |
| 10 | 4.2 | 0.05 | 11.5 | 0.8 | 16.5 | 2.1 | 42 | 1.1 | C | 0.170 |

According to the present invention, the viscosity of the core layer is decreased, so that the core layer can better match the inner cladding layer and the trench cladding layer. In addition, the core layer is combined with the metal-doped outer cladding layer having a matching viscosity. In this way, the virtual temperature of the optical fiber is overall decreased. Moreover, by means of the trench cladding layer design, fundamental mode leakage is restrained, thereby achieving ultra low attenuation performance.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A doping optimized single-mode optical fiber with ultra low attenuation, comprising:
a core layer and cladding layers, wherein the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary outer cladding layer;
wherein a content of fluorine in the core layer is less than or equal to about 0.5 wt %, a relative refractive index contribution ΔGe of germanium in the core layer is less than or equal to about 0.12%, and a relative refractive index $\Delta n_1$ of the core layer is less than or equal to about 0.12%;
wherein a content of fluorine in the inner cladding layer is in a range of about 0.5 wt % to 1.5 wt %, and a relative refractive index $\Delta n_2$ of the inner cladding layer is less than or equal to about −0.14%;
wherein a content of fluorine in the trench cladding layer is in a range of about 1 wt % to 3 wt %, and a relative refractive index $\Delta n_3$ of the trench cladding layer is less than or equal to about −0.25%;
wherein a content of fluorine in the auxiliary outer cladding layer is in a range of about 0.5 wt % to 2 wt %, and a relative refractive index $\Delta n_4$ of the auxiliary outer cladding layer is less than or equal to about −0.14%; and
wherein the outer cladding layer is a pure silicon dioxide glass layer and/or a metal-doped silicon dioxide glass layer.

2. The doping optimized single-mode optical fiber according to claim 1, wherein metal dopants doped in the outer cladding layer comprise aluminum and alkali metals, and a total content of the metal dopants is less than or equal to about 25 ppm, wherein a content of aluminum is in a range of about 1 ppm to 18 ppm, and a total content of the alkali metals is less than or equal to about 2 ppm.

3. The doping optimized single-mode optical fiber with according to claim 2, wherein the alkali metals are one or more of lithium, sodium and potassium.

4. The doping optimized single-mode optical fiber according to claim 2, wherein the metal dopants further comprise one or more of iron, calcium, magnesium and titanium.

5. The doping optimized single-mode optical fiber according to claim 2, wherein a radius $r_1$ of the core layer is in a range of about 4.0 μm to 6.0 μm.

6. The doping optimized single-mode optical fiber according to claim 5, wherein a radius $r_2$ of the inner cladding layer is in a range of about 10 μm to 14 μm, a radius $r_3$ of the trench cladding layer is in a range of about 12.5 μm to 17 μm, and a radius $r_4$ of the auxiliary outer cladding layer is in a range of about 40 μm to 50 μm.

7. The doping optimized single-mode optical fiber according to claim 2, wherein a diameter of the outer cladding layer is about 125 μm.

8. The doping optimized single-mode optical fiber according to claim 2, wherein the relative refractive index $\Delta n_1$ of the core layer is in a range of about 0.12% to −0.08%, the relative refractive index $\Delta n_2$ of the inner cladding layer is in a range of about −0.14% to −0.35%, the relative refractive index $\Delta n_3$ of the trench cladding layer is in a range of about −0.25% to −0.75%, and the relative refractive index $\Delta n_4$ of the auxiliary outer cladding layer is in a range of about −0.14% to −0.56%.

9. The doping optimized single-mode optical fiber according to claim 2, wherein an attenuation coefficient of the optical fiber at a wavelength of about 1550 nm is less than or equal to about 0.175 dB/km.

10. The doping optimized single-mode optical fiber according to claim 1, wherein a radius $r_1$ of the core layer is in a range of about 4.0 μm to 6.0 μm.

11. The doping optimized single-mode optical fiber according to claim 10, wherein a radius $r_2$ of the inner cladding layer is in a range of about 10 μm to 14 μm, a radius $r_3$ of the trench cladding layer is in a range of about 12.5 μm to 17 μm, and a radius $r_4$ of the auxiliary outer cladding layer is in a range of about 40 μm to 50 μm.

12. The doping optimized single-mode optical fiber according to claim 1, wherein a diameter of the outer cladding layer is about 125 μm.

13. The doping optimized single-mode optical fiber according to claim 1, wherein the relative refractive index $\Delta n_1$ of the core layer is in a range of about 0.12% to −0.08%, the relative refractive index $\Delta n_2$ of the inner cladding layer is in a range of about −0.14% to −0.35%, the relative refractive index $\Delta n_3$ of the trench cladding layer is in a range of about −0.25% to −0.75%, and the relative refractive index $\Delta n_4$ of the auxiliary outer cladding layer is in a range of about −0.14% to −0.56%.

14. The doping optimized single-mode optical fiber according to claim 1, wherein an attenuation coefficient of the optical fiber at a wavelength of about 1550 nm is less than or equal to about 0.175 dB/km.

* * * * *